United States Patent
Gal et al.

(10) Patent No.: US 10,475,188 B2
(45) Date of Patent: Nov. 12, 2019

(54) IMAGE PROCESSING DEVICE AND IMAGE ENHANCING METHOD

(71) Applicant: HANWHA TECHWIN CO., LTD., Seongnam-si (KR)

(72) Inventors: Jun Ho Gal, Changwon-si (KR); Eun Cheol Choi, Changwon-si (KR)

(73) Assignee: HANWHA TECHWIN CO., LTD., Seongnam-si (KR)

( * ) Notice: Subject to any disclaimer, the term of this patent is extended or adjusted under 35 U.S.C. 154(b) by 182 days.

(21) Appl. No.: 15/609,821

(22) Filed: May 31, 2017

(65) Prior Publication Data

US 2018/0182070 A1 Jun. 28, 2018

(30) Foreign Application Priority Data

Dec. 27, 2016 (KR) .................. 10-2016-0180418

(51) Int. Cl.
*G06K 9/40* (2006.01)
*G06T 7/13* (2017.01)
*G06T 5/00* (2006.01)

(52) U.S. Cl.
CPC .............. *G06T 7/13* (2017.01); *G06T 5/008* (2013.01); *G06T 2207/10024* (2013.01); *G06T 2207/20208* (2013.01)

(58) Field of Classification Search
None
See application file for complete search history.

(56) References Cited

U.S. PATENT DOCUMENTS

| 5,767,978 | A  | * | 6/1998  | Revankar | H04N 1/40   |
|           |    |   |         |          | 358/296     |
| 7,538,822 | B2 | * | 5/2009  | Lee      | G06T 5/20   |
|           |    |   |         |          | 348/606     |
| 8,131,108 | B2 |   | 3/2012  | Neuman   |             |
| 8,446,532 | B2 | * | 5/2013  | Lee      | G06T 5/009  |
|           |    |   |         |          | 348/678     |
| 8,520,953 | B2 | * | 8/2013  | Shin     | G06T 7/12   |
|           |    |   |         |          | 382/199     |
| 8,861,885 | B2 | * | 10/2014 | Zimmer   | G06T 5/002  |
|           |    |   |         |          | 348/607     |
| 8,995,765 | B2 | * | 3/2015  | Kim      | G06T 5/007  |
|           |    |   |         |          | 382/167     |

(Continued)

FOREIGN PATENT DOCUMENTS

KR 10-1518722 B1 5/2015
KR 10-2015-0112287 A 10/2015

*Primary Examiner* — Jayesh A Patel
(74) *Attorney, Agent, or Firm* — Sughrue Mion, PLLC

(57) ABSTRACT

Provided are an image processing device and an image enhancing method. The image enhancement method for the image processing device includes: calculating a first minimum value, a first maximum value, and a first average value of a luminance of a region based on a pixel in an image; calculating a first gain with respect to a pixel having a pixel value between the first minimum value and the first average value, and a second gain with respect to a pixel having a pixel value between the first average value and the first maximum value; and calculating a first correction value by correcting the pixel value of the pixel by using the first gain or the second gain according to a result of comparing the pixel value of the pixel with the first average value.

20 Claims, 8 Drawing Sheets

(56) References Cited

U.S. PATENT DOCUMENTS

| | | | |
|---|---|---|---|
| 9,008,459 B2* | 4/2015 | Huang | G06T 5/003 |
| | | | 382/275 |
| 9,373,053 B2* | 6/2016 | Parfenov | G06K 9/4638 |
| 2002/0067862 A1* | 6/2002 | Kim | G06T 5/004 |
| | | | 382/266 |
| 2008/0001976 A1* | 1/2008 | Kim | G09G 5/00 |
| | | | 345/694 |
| 2008/0118170 A1* | 5/2008 | Zhou | H04N 19/172 |
| | | | 382/251 |
| 2010/0014771 A1* | 1/2010 | Kim | G06T 5/20 |
| | | | 382/263 |
| 2010/0040300 A1 | 2/2010 | Kang et al. | |
| 2010/0215286 A1* | 8/2010 | Takahashi | G06T 3/4053 |
| | | | 382/274 |
| 2014/0286571 A1* | 9/2014 | Kunisue | G06T 5/40 |
| | | | 382/168 |
| 2015/0279011 A1 | 10/2015 | Jeon et al. | |

\* cited by examiner

IMAGE PROCESSING DEVICE AND IMAGE ENHANCING METHOD

CROSS-REFERENCE TO THE RELATED APPLICATION

This application claims priority from Korean Patent Application No. 10-2016-0180418, filed on Dec. 27, 2016, in the Korean Intellectual Property Office, the disclosure of which is incorporated herein in its entirety by reference.

BACKGROUND

1. Field

Apparatuses and methods consistent with exemplary embodiments relate to an image processing device and an image enhancing method.

2. Description of the Related Art

A camera that has to monitor outdoors for 24 hours uses a method of enhancing image quality through a defog function when it is foggy.

SUMMARY

One or more exemplary embodiments provide an image enhancing method capable of reducing unnecessary noise and/or a halo effect generated during enhancing images that have degraded due to fog.

Additional aspects will be set forth in part in the description which follows and, in part, will be apparent from the description, or may be learned by practice of the exemplary embodiments.

According to an aspect of an exemplary embodiment, there is provided an image enhancement method for an image processing device, the image enhancement method including: calculating a first minimum value, a first maximum value, and a first average value of a luminance of a region based on a pixel in an image; calculating a first gain with respect to a pixel having a pixel value between the first minimum value and the first average value, and a second gain with respect to a pixel having a pixel value between the first average value and the first maximum value; and calculating a first correction value by correcting the pixel value of the pixel by using the first gain or the second gain according to a result of comparing the pixel value of the pixel with the first average value.

The calculating of the first correction value may include calculating the first correction value of the pixel by using the first gain, in response to determining that the pixel value of the pixel is equal to or less than the first average value, and calculating the first correction value of the pixel by using the second gain, in response to determining that the pixel value is greater than the first average value.

The first gain may be a minimum value between a ratio of a difference between the first minimum value and the first average value and a difference between a minimum value of a dynamic range and the first average value, and a user gain, and the second gain may be a minimum value between a ratio of a difference between the first maximum value and the first average value and a difference between a maximum value of the dynamic range and the first average value, and the user gain.

The image enhancement method may further include calculating a first edge value of an entire image and a second edge value of the region based on the pixel, and calculating a third gain based on the first edge value and the second edge value.

The first gain may be a minimum value between a ratio of a difference between the first minimum value and the first average value and a difference between the minimum value of the dynamic range and the first average value, and the third gain, and the second gain may be a minimum value between a ratio of a difference between the first maximum value and the first average value and a difference between the maximum value of the dynamic range and the first average value, and the third gain.

A third gain with respect to a pixel, in which the second edge value is less than the first edge value, may be less than a third gain with respect to a pixel, in which the second edge value is greater than the first edge value.

The image enhancement method may further include calculating a second minimum value, a second maximum value, and a second average value of a luminance of an entire image, calculating a fourth gain with respect to a pixel having a pixel value between the second minimum value and the second average value and a fifth gain with respect to a pixel having a pixel value between the second average value and the second maximum value, calculating a second correction value by correcting the pixel value of the pixel by using the fourth gain or the fifth gain according to a result of comparing the pixel value of the pixel with the second average value, and calculating a weighted sum of the first correction value and the second correction value by using a weighted value set based on the first edge average value and the second edge average value.

The first gain may be a minimum value between a ratio of a difference between the first minimum value and the first average value and a difference between the minimum value of the dynamic range and the first average value, and the third gain, and the second gain may be a minimum value between a ratio of a difference between the first maximum value and the first average value and a difference between the maximum value of the dynamic range and the first average value, and the third gain.

The fourth gain may be a minimum value between a ratio of a difference between the second minimum value and the second average value and a difference between a minimum value of a dynamic range and the second average value, and the user gain, and the fifth gain may be a minimum value between a ratio of a difference between the second maximum value and the second average value and a difference between a maximum value of the dynamic range and the second average value, and the user gain.

A weighted value set in the first correction value of a pixel, in which the second edge value is less than the first edge value, may be less than a weighted value set in the second correction value, and weighted values set in the first correction value and the second correction value of a pixel, in which the second edge value is greater than the first edge value, may be 1 and 0, respectively.

According to an aspect of another exemplary embodiment, there is provided an image processing device including: a luminance calculator configured to calculate a first minimum value, a first maximum value, and a first average value of a luminance of a region based on a pixel in an image; a gain calculator configured to calculate a first gain with respect to a pixel having a pixel value between the first minimum value and the first average value, and a second gain with respect to a pixel having a pixel value between the first average value and the first maximum value; and a corrector configured to calculate a first correction value by correcting the pixel value of the pixel by using the first gain or the second gain according to a result of comparing the pixel value of the pixel with the first average value.

The corrector may be configured to calculate the first correction value of the pixel by using the first gain, in response to determining that the pixel value of the pixel is equal to or less than the first average value, and to calculate the first correction value of the pixel by using the second gain, in response to determining that the pixel value is greater than the first average value.

The first gain may be a minimum value between a ratio of a difference between the first minimum value and the first average value and a difference between a minimum value of a dynamic range and the first average value, and a user gain, and the second gain may be a minimum value between a ratio of a difference between the first maximum value and the first average value and a difference between a maximum value of the dynamic range and the first average value, and the user gain.

The image processing device may further include an edge detector configured to calculate a first edge value of an entire image and a second edge value of the region based on the pixel.

The gain calculator may calculate a third gain based on the first edge value and the second edge value. The first gain may be a minimum value between a ratio of a difference between the first minimum value and the first average value and a difference between the minimum value of the dynamic range and the first average value, and the third gain, and the second gain may be a minimum value between a ratio of a difference between the first maximum value and the first average value and a difference between the maximum value of the dynamic range and the first average value, and the third gain.

A third gain with respect to a pixel, in which the second edge value is less than the first edge value, may be less than a third gain with respect to a pixel, in which the second edge value is greater than the first edge value.

The image processing device may further include a weight setter configured to determine a weighted value based on the first edge value and the second edge value. The luminance calculator may calculate a second minimum value, a second maximum value, and a second average value of a luminance of the entire image, the gain calculator may calculate a fourth gain with respect to a pixel having a pixel value between the second minimum value and the second average value and a fifth gain with respect to a pixel having a pixel value between the second average value and the second maximum value, and the corrector may calculate a second correction value by correcting the pixel value of the pixel by using the fourth gain or the fifth gain according to a result of comparing the pixel value of the pixel with the second average value, and calculate a weighted sum of the first correction value and the second correction value by using the weighted value.

The first gain may be a minimum value between a ratio of a difference between the first minimum value and the first average value and a difference between the minimum value of the dynamic range and the first average value, and the third gain, and the second gain may be a minimum value between a ratio of a difference between the first maximum value and the first average value and a difference between the maximum value of the dynamic range and the first average value, and the third gain.

The fourth gain may be a minimum value between a ratio of a difference between the second minimum value and the second average value and a difference between a minimum value of a dynamic range and the second average value, and the user gain, and the fifth gain may be a minimum value between a ratio of a difference between the second maximum value and the second average value and a difference between a maximum value of the dynamic range and the second average value, and the user gain.

A weighted value set in the first correction value of a pixel, in which the second edge value is less than the first edge value, may be less than a weighted value set in the second correction value, and weighted values set in the first correction value and the second correction value of a pixel, in which the second edge value is greater than the first edge value, may be 1 and 0, respectively.

According to an aspect of another exemplary embodiment, a non-transitory computer-readable recording medium having recorded thereon a program, which when executed by a computer, causes the computer to execute the above image enhancement method.

BRIEF DESCRIPTION OF THE DRAWINGS

The above and/or other aspects will become apparent and more readily appreciated from the following description of the exemplary embodiments, taken in conjunction with the accompanying drawings, in which.

DETAILED DESCRIPTION OF THE EXEMPLARY EMBODIMENTS

Figure 1:
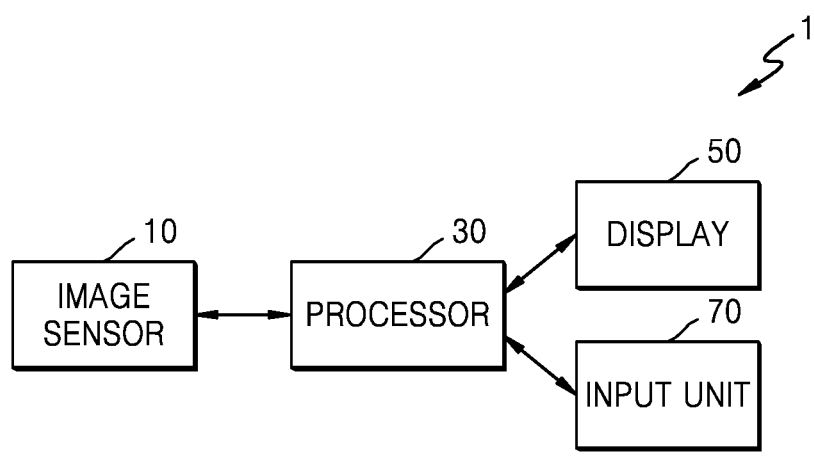
FIG. 1 is a schematic block diagram of an image processing device according to an exemplary embodiment.

Reference will now be made in detail to exemplary embodiments which are illustrated in the accompanying drawings, wherein like reference numerals refer to like elements throughout. In this regard, the exemplary embodiments may have different forms and should not be construed as being limited to the descriptions set forth herein. Accordingly, the exemplary embodiments are merely described below with reference to the figures, to explain aspects of the inventive concept. As used herein, the term "and/or" includes any and all combinations of one or more of the associated listed items. Expressions such as "at least one of," when preceding a list of elements, modify the entire list of elements and do not modify the individual elements of the list.

Content provided hereinafter just illustrates the principles of the present disclosure. Therefore, one of ordinary skill in the art may embody the principles of the present disclosure, although not shown or described explicitly herein, and invent a variety of devices included in the spirit and scope of the present disclosure. In addition, all of the conditional terms and embodiments listed herein are, in principle, intended to make the concept of the present disclosure understood, and not limited to the particular embodiments and conditions listed herein. In addition, all the detailed descriptions listing particular embodiments, as well as the principles of the present disclosure, aspects and embodiments, are to be understood to intend to include structural and functional equivalents of such information. Also, it is understood that such equivalents include equivalents to be developed in the future, that is, all devices invented to perform the same function, as well as equivalents that are currently known.

Thus, functions of various elements shown in the drawings, including functional blocks labelled as a processor or a similar concept may be provided through use of hardware that has capability of executing software in association with appropriate software, as well as dedicated hardware. When provided by a processor, functions may be provided by a single dedicated processor, single shared processor, or a plurality of individual processors, some of which may be shared. Furthermore, a processor, control, or a term suggested as a similar concept thereof, although it is clearly used, should not be construed as exclusively citing hardware having the ability to execute software, but should be construed as implicitly including Digital Signal Processor (DSP) hardware, or ROM, RAM, or non-volatile memory for storing software without restriction. The processor, control, or term may also include known other hardware.

It will be understood that, when a portion "includes" an element, another element may be further included, rather than excluding the existence of the other element, unless otherwise described.

Hereinafter, one or more exemplary embodiments will be described in detail with reference to accompanying drawings.

FIG. 1 is a schematic block diagram of an image processing device exemplary according to an embodiment.

Referring to FIG. 1, the image processing device 1 may include an image sensor 10, an image processor 30, a display 50, and an input unit 70.

The image processing device 1 may include various types of appliances such as a surveillance camera including a visual camera, a thermal camera, a specialized camera, etc., a wireless communication device, a personal digital assistant (PDA), a laptop computer, a desktop computer, a camcorder, a digital camera, a closed circuit television (CCTV), an action camera, a digital recording apparatus, a network-enable digital TV, a mobile phone, a cellular phone, a satellite telephone, a bidirectional communication device, etc. Also, the image processing device 1 may be an image processing system, in which at least one of the image sensor 10, the image processor 30, the display 50, and the input unit 70 is separately provided, connected through wires or wirelessly to exchange data.

The image sensor 10 may include a photoelectric conversion device such as a charge coupled device (CCD) or a complementary metal oxide semiconductor (CMOS). The image sensor 10 captures scenes in front thereof to obtain image information. A lens (not shown) for receiving optical signals may be provided at a front of the image sensor 10.

The image processor 30 may be implemented as variety numbers hardware and/or software configurations executing certain functions. For example, the image processor 30 may denote a data processing device built in hardware, and include a physically structured circuit for executing functions expressed as codes or commands included in a program. For example, the data processing device built in the hardware may be any one of a microprocessor, a central processing unit (CPU), a processor core, a multiprocessor, an application-specific integrated circuit (ASIC), a field programmable gate array (FPGA), etc. However, this is merely an example and is not limited thereto.

The image processor 30 reduces noise in an image frame, and may perform a signal processing for improving image quality, for example, a gamma correction, a color filter array interpolation, a color matrix, a color correction, a color enhancement, etc.

The image processor 30 may correct image by analyzing brightness of an image input from the image sensor 10. The image processor 30 may perform a compensation for enhancing contrast by enlarging a range between a minimum value and a maximum value of the luminance of the input image. The image sensor 10 installed outside may not obtain detailed information of a scene due to degradation of the image obtained under exposure to intense light, rain, snow, dust, smoke, fog, etc. The image processor 30 may correct the degradation of the image due to external environmental conditions through enhancement of the contrast.

The image processor 30 calculates a local minimum value, a local maximum value, and a local average value with respect to luminance of a region based on a pixel in an image, calculates a first gain of a pixel having a pixel value between the local minimum value and the local average value and a second gain of a pixel having a pixel value between the local average value and the local maximum value, and calculates a local correction value by correcting the pixel value of the pixel by using the first gain or the second gain according to a result of comparing the pixel value of the pixel with the local average value, in order to generate a corrected image. Here, the first gain may be a minimum value between a ratio of a difference between the local minimum value and the local average value and a difference between a minimum value of a dynamic range and the local average value and a user gain, and the second gain may be a minimum value between a ratio of a difference between the local maximum value and the local average value and a difference between a maximum value of a dynamic range and the local average value and the user gain.

The image processor 30 may further calculate a noise removal gain based on a global edge value of the entire image and a local edge value of the region based on the pixel. In this case, the first gain may be a minimum value between a ratio of a difference between the local minimum value and the local average value and a difference between a minimum value of the dynamic range and the local average value and the noise removal gain, and the second gain may be a minimum value between a ratio of a difference between the local maximum value and the local average value and a difference between a maximum value of the dynamic range and the local average value and the noise removal gain.

The image processor 30 calculates a global minimum value, a global maximum value, and a global average value of luminance of the entire image, calculates a fourth gain with respect to a pixel having a pixel value between the global minimum value and the global average value and a fifth gain with respect to a pixel having a pixel value between the global average value and the global maximum value, and calculates a global correction value by correcting the pixel value of the pixel by using the fourth gain or the fifth gain according to a result of comparing the pixel value of the pixel with the global average value. In addition, the image processor 30 sets a weighted value of each of the local correction value and the global correction value according to a result of comparing the global edge value with the local edge value, and calculates a weighted sum of the local correction value and the global correction value to generate a corrected image.

The display 50 may be connected to the image processor 30 by wire or wirelessly, and signal process the image output from the image processor 30 and provide the image to a user. The display 50 may include a liquid crystal display (LCD) panel, an organic light-emitting display (OLED) panel, an electrophoretic display (EPD) panel, etc. The display 50 may be implemented as a touch screen so as to receive a user input through a touch operation, and may function as a user input interface.

The input unit 70 may be connected to the image processor 30 by wire or wirelessly, and generate input data for controlling the image processor 30. The input unit 70 may include a keypad, a dome switch, a touch pad (a capacitive overlay type, a resistive overlay type, an infrared beam type, a surface acoustic wave type, an integral strain gauge type, and a piezoelectric type), a mouse, a jog wheel, a jog switch, or the like. The user may input parameters for correcting images via the input unit 70.

Figure 2:
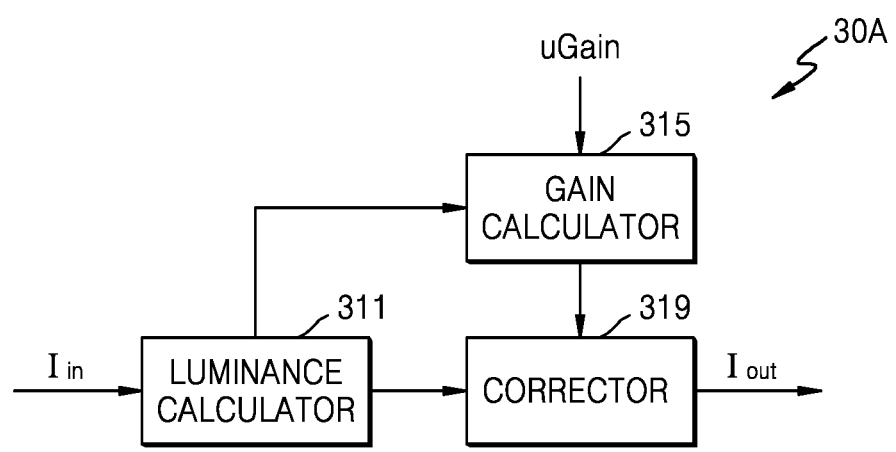
FIG. 2 is a schematic block diagram of an image processor according to an exemplary embodiment.
Figure 3:
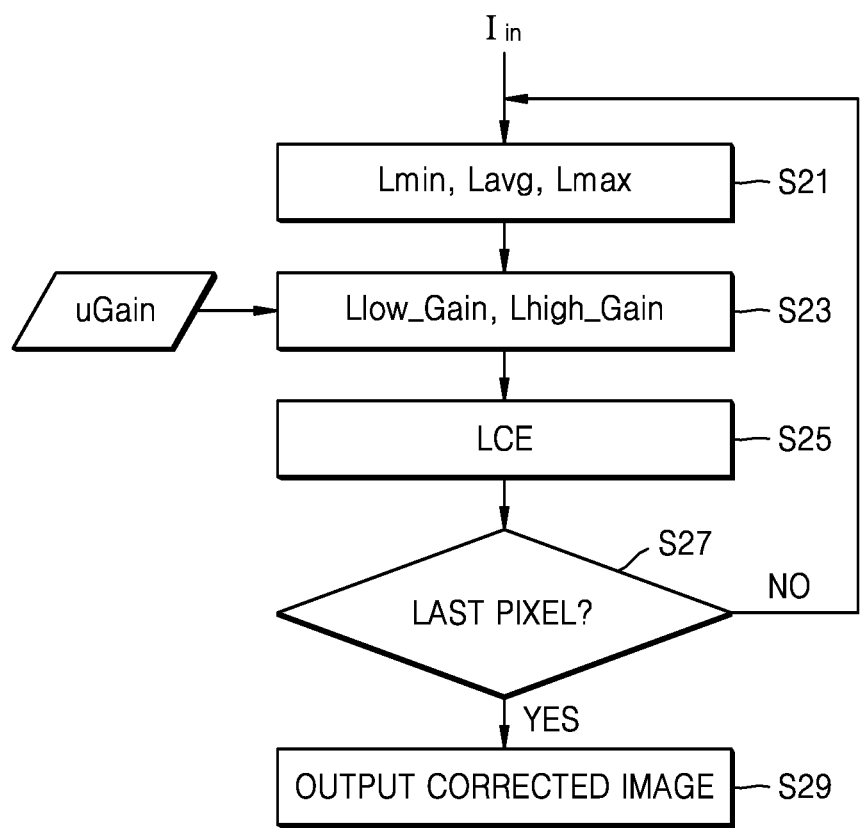
FIG. 3 is a flowchart illustrating an image enhancing function of the image processor of FIG. 2.

FIG. 2 is a schematic block diagram of an image processor 30A according to an exemplary embodiment. FIG. 3 is a flowchart illustrating an image enhancing function of the image processor 30A of FIG. 2.

Referring to FIGS. 2 and 3, the image processor 30A may include a luminance calculator 311, a gain calculator 315, and a corrector 319.

The luminance calculator 311 may calculate a local minimum value Lmin(x,y), a local maximum value Lmax(x,y), and a local average value Lavg(x,y) from an input image Iin (operation S21).

The input image Iin may include information about a plurality of pixels arranged in a plurality of rows and columns. A pixel may contain a component defined in a color space. The color space may be an RGB color space, a YUV color space, a YCbCr color space, etc., but may not be limited thereto, and may be applied to various types of color spaces. A pixel value of a pixel may be represented as a luminance value that is a component in the color space. The luminance value may have a value within a dynamic range of a gray level determined according to the number of bits in image data. For example, the pixel value may be one of 0 to 255 in an image of 8 bits, and the pixel value may be one of 0 to 4095 in an image of 12 bits. Hereinafter, an arbitrary pixel, for example, a pixel having a coordinate (x,y) in an image of 8 bits (hereinafter, referred to as 'current pixel'), will be described, but the disclosure may be applied to images of different data bits.

The luminance calculator 311 may set a block of a predetermined size based on a current pixel in the input image Iin (for example, a block of (2n+1)×(2m+1), n≥0, m≥0), and detect the local minimum value Lmin(x,y) that is the minimum value and the local maximum value Lmax(x,y) that is the maximum value from among the pixel values of the pixels within the block, as expressed by following Equations (1) and (2).

$$L\min(x,y)=\min(INL(k,l)|k\in\{x-n,x-n+1,\ldots x-1,x,x+1,\ldots x+n-1,x+n\}, l\in\{y-m,y-m+1,\ldots y-1,y,y+1,\ldots y+m-1,y+m\}) \quad (1)$$

$$L\max(x,y)=\max(INL(k,l)|k\in\{x-n,x-n+1,\ldots x-1,x,x+1,\ldots x+n-1,x+n\}, l\in\{y-m,y-m+1,\ldots y-1,y,y+1,\ldots y+m-1,y+m\}) \quad (2)$$

The corrector 319 may calculate a local correction value LCE(x,y) of the current pixel based on the local minimum value Lmin(x,y), the local maximum value Lmax(x,y), and the pixel value of the current pixel INL(x,y), as expressed by following Equation (3). A gain is a ratio of a variation in an output luminance with respect to a variation in an input luminance.

$$LCE(x,y)=(INL(x,y)-L\min(x,y))*\text{Gain}$$

$$\text{Gain}=255/(L\max(x,y)-L\min(x,y)) \quad (3)$$

Contrast of the image may be enhanced by correcting the pixel value according to the above Equation (3), and thus, visibility degraded due to the fog or fine dust may be improved. However, in the above Equation (3), a gain representing a correction strength (stretching strength) is fixed within the block. Therefore, according to the exemplary embodiment, the local average value Lavg(x,y) is used to adjust the gain by using the gain calculator 315.

The luminance calculator 311 may calculate the local average value Lavg(x,y) within the block based on the current pixel of the input image Iin as expressed by following Equation (4), in addition to the local minimum value Lmin(x,y) and the local maximum value Lmax(x,y).

$$Lavg(x,y)=[INL(k,l)|k\in\{x-n,x-n+1,\ldots x-1,x,x+1,\ldots x+n-1,x+n\}, l\in\{y-m,y-m+1,\ldots y-1,y,y+1,\ldots y+m-1,y+m\}]/((2n+1)*(2m+1)) \quad (4)$$

The gain calculator 315 may calculate a first low gain Llow_Gain(x,y) and a first high gain Lhig_Gain(x,y) by using the local minimum value Lmin(x,y), the local maximum value Lmax(x,y), and the local average value Lavg(x,y) (operation S23). The gain calculator 315 may calculate the first low gain Llow_Gain(x,y) and the first high gain Lhig_Gain(x,y) by reflecting a user gain uGain, as expressed by following Equations (5) and (6).

$$Llow\_Gain(x,y)=\min((Lavg(x,y)-0)/\text{InpMinAvg}, u\text{Gain}) \quad (5)$$

$$Lhig\_Gain(x,y)=\min((255-Lavg(x,y))/\text{InpMaxAvg}, u\text{Gain}) \quad (6)$$

$$\text{InpMinAvg}=Lavg(x,y)-L\min(x,y) \quad (7)$$

$$\text{InpMaxAvg}=L\max(x,y)-Lavg(x,y) \quad (8)$$

The gain calculator 315 may determine a minimum value between a gain {(Lavg(x,y)−0)/InpMinAvg} for stretching a range between the local minimum value Lmin(x,y) and the local average value Lavg(x,y) to a range between a minimum value of a dynamic range 0 and the local average value Lavg(x,y) and the user gain uGain set by the user, as the first low gain Llow_Gain(x,y). A denominator InpMinAvg of the gain {(Lavg(x,y)−0)/InpMinAvg} is a difference between the local average value Lavg(x,y) and the local minimum value Lmin(x,y) as shown in Equation (7), and a numerator is a difference between the local average value Lavg(x,y) and the minimum value of the dynamic range 0.

The gain calculator 315 may determine a minimum value between a gain {(255−Lavg(x,y))/InpMaxAvg} for stretching a range between the local average value Lavg(x,y) and the local maximum value Lmin(x,y) to a range between the local average value Lavg(x,y) and a maximum value of a dynamic range 255 and the user gain uGain, as the first high gain Lhig_Gain(x,y). A denominator InpMaxAvg of the gain {(255−Lavg(x,y))/InpMaxAvg} is a difference between the local average value Lavg(x,y) and the local maximum value Lmax(x,y) as expressed by Equation (8), and a numerator is a difference between the local average value Lavg(x,y) and the maximum value of the dynamic range 255.

That is, the gain calculator 315 may reflect a strength set by the user without fixing the stretching strength, but may restrict an output within the dynamic range.

The corrector 319 may calculate a local correction value LCE(x,y) of the current pixel by using the first low gain Llow_Gain(x,y) or the first high gain Lhig_Gain(x,y), based on a result of comparing the pixel value INL(x,y) of the current pixel with the local average value Lavg(x,y) (operation S25).

If the pixel value INL(x,y) of the current pixel is equal to or less than the local average value Lavg(x,y), the corrector 319 may calculate the local correction value LCE(x,y) of the current pixel by using the first low gain Llow_Gain(x,y) calculated by Equation (5), as expressed by following Equations (9) and (10).

$$LCE(x,y)=(INL(x,y)-Lmin(x,y)*Llow\_Gain(x,y)+Lavg(x,y)-\text{OutMinAvg}, \{\text{if } INL(x,y) \leq Lavg(x,y)\} \quad (9)$$

$$\text{OutMinAvg}=\text{InpMinAvg}*Llow\_Gain(x,y) \quad (10)$$

If the pixel value INL(x,y) of the current pixel is greater than the local average value Lavg(x,y), the corrector 319 may calculate the local correction value LCE(x,y) of the current pixel by using the first high gain Lhig_Gain(x,y) calculated by Equation (6), as expressed by following Equations (11) and (12).

$$LCE(x,y)=(INL(x,y)-Lavg(x,y))*Lhig\_Gain(x,y)+Lavg(x,y), \{\text{if } INL(x,y) > Lavg(x,y)\} \quad (11)$$

$$\text{OutMaxAvg}=\text{InpMaxAvg}*Lhig\_Gain(x,y) \quad (12)$$

The image processor 30A determines whether the current pixel is the last pixel (operation S27), and outputs a corrected image Iout by repeatedly performing operations S21 to S25 to the last pixel (operation S29).

In the exemplary embodiment, the luminance of the pixel is corrected based on the local average value Lavg(x,y), that is, whether the pixel value is less than the local average value Lavg(x,y) or whether the pixel value is greater than the local average value Lavg(x,y), and thus, the gain set by the user may be reflected. In addition, the local correction value is calculated by applying a gain that varies depending on a result of comparing the local average value Lavg(x,y) with an input pixel value, and thus, contrast of the output image may be improved.

Figure 4:
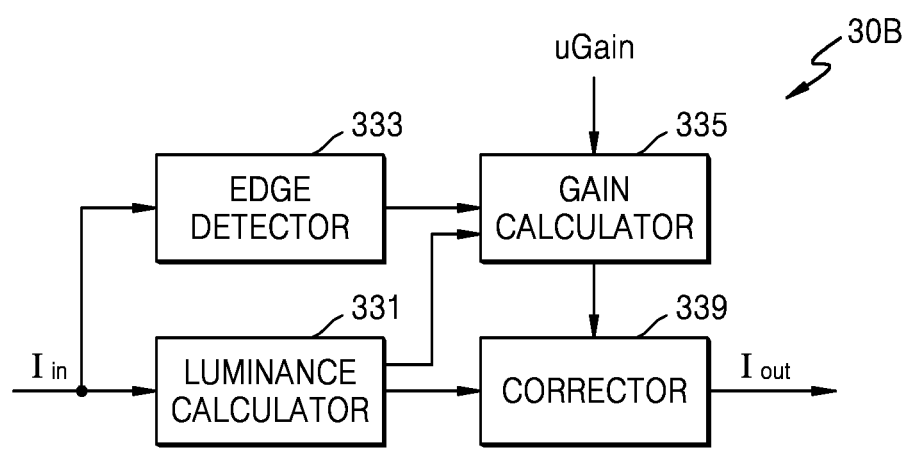
FIG. 4 is a schematic block diagram of an image processor according to another exemplary embodiment.
Figure 5:
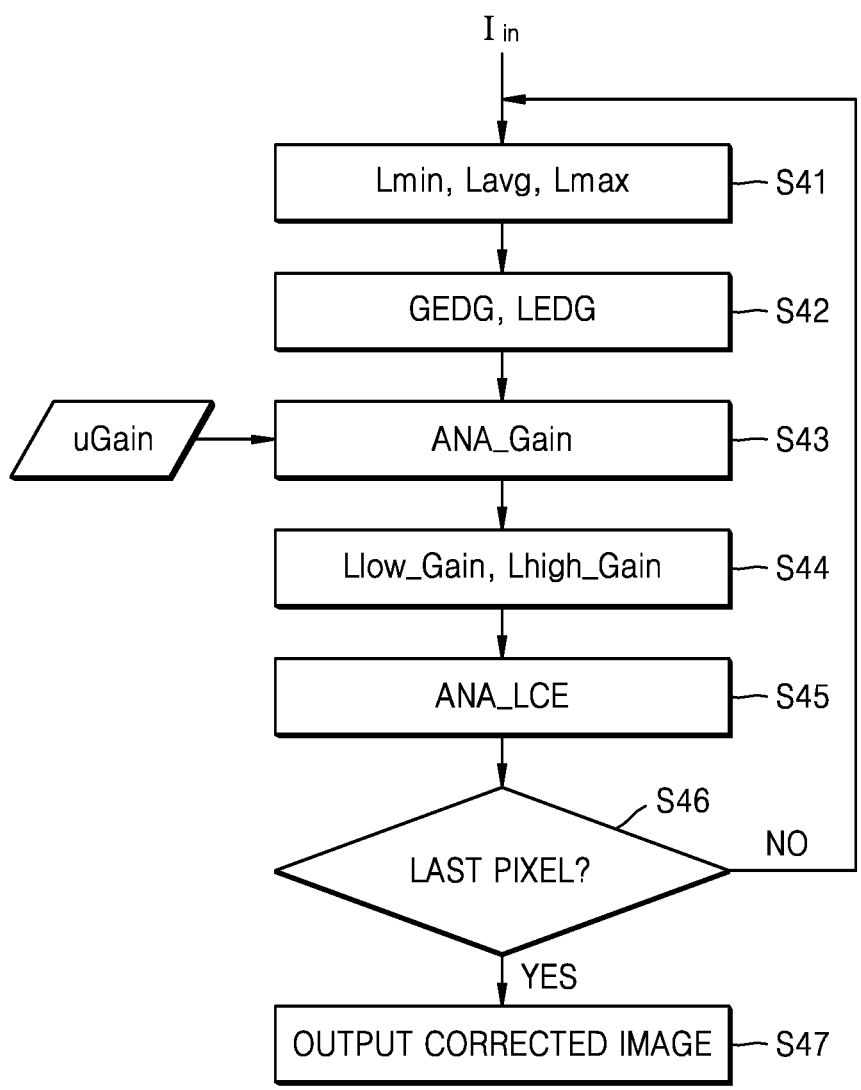
FIG. 5 is a flowchart illustrating an image enhancing function of the image processor of FIG. 4, according to an exemplary embodiment.

FIG. 4 is a schematic block diagram of an image processor 30B according to another exemplary embodiment. FIG. 5 is a flowchart illustrating an image enhancing function of the image processor 30B of FIG. 4.

Referring to FIGS. 4 and 5, the image processor 30B may include a luminance calculator 331, an edge detector 333, a gain calculator 335, and a corrector 339. The exemplary embodiment illustrated with reference to FIG. 4 is different from the exemplary embodiment illustrated with reference to FIG. 2 in view of further including the edge detector 333. Hereinafter, descriptions about the same elements as those of FIG. 2 will be omitted.

Visibility of the image may be improved through the local enhancement that reflects luminance of peripheral pixels to each of the pixels, but in a region in which a difference between an average value and a minimum value or a difference between the average value and a maximum value is very small like the sky or a flat wall surface, a noise amplifying artifact may occur. The noise amplifying artifact may be reduced by increasing a size of the block, but in this case, the contrast enhancing effect is also decreased. Therefore, according to the exemplary embodiment, a degree of enhancing the contrast is adjusted in a pixel unit by reflecting an edge value.

The luminance calculator 311 may calculate the local minimum value Lmin(x,y), the local maximum value Lmax(x,y)) and the local average value Lavg(x,y) according to Equations (1), (2), and (4), within a block based on a current pixel in the input image Iin (for example, (2n+1)×(2m+1) block, n≥0, m≥0) (operation S41).

The edge detector 333 may detect an edge value EDG(x,y) that is a magnitude value of edge at a location of each pixel in the input image Iin. The edge detector 333 may detect the edge value EDG(x,y) of each pixel by applying an edge detection filter such as Gaussian filter, Laplacian of Gaussian (LoG) filter, Gaussian of Laplacian (GoL) filter, Sobel filter, etc. to the input image Iin. The edge detection may not be limited to the above method using the filter, but various edge detection methods may be used.

The edge detector 333 may calculate a global edge value GEDG and a local edge value LEDG(x,y) of the input image Iin based on the edge value EDG(x,y) of each pixel (operation S42). The global edge value GEDG is an average edge value in the entire image. The local edge value LEDG(x,y) is an average edge value within the block based on the current pixel (for example, (2n+1)×(2m+1) block, n≥0, m≥0).

The gain calculator 335 may calculate a noise removal gain ANA_Gain(x,y) as expressed by following Equations (13) and (14) by using the global edge value GEDG and the local edge value LEDG(x,y), and the user gain uGain set by the user (operation S43). An edge value of the region in which the noise amplifying artifact occurs is very small. Therefore, if the local edge value LEDG(x,y) is small, the image is enhanced by using a low gain, and if the local edge value LEDG(x,y) is large, the image is enhanced by using a high gain. That is, the noise removal gain ANA_Gain(x,y) is a parameter for adjusting a degree of removing noise in a pixel unit after defining a regional characteristic based on the edge amount. A noise removal gain with respect to a pixel, a local edge value of which is less than a global edge value thereof, is less than that of a pixel, a local edge value of which is greater than a global edge value thereof.

$$ANA\_Gain(x,y)=(u\text{Gain}-1)*(LEDG(x,y)/GEDG)+1, \{\text{if } LEDG(x,y)<GEDG\} \quad (13)$$

$$ANA\_Gain(x,y)=u\text{Gain}, \{\text{if } LEDG(x,y) \geq GEDG\} \quad (14)$$

If the local edge value LEDG(x,y) is less than the global edge value GEDG, the gain calculator 335 calculates the noise removal gain ANA_Gain(x,y) by multiplying a value subtracting 1 from the user gain uGain by a ratio of the local edge value LEDG(x,y) with respect to the global edge value GEDG and adding 1 to the multiplied value. If the local edge value LEDG(x,y) is equal to or greater than the global edge value GEDG, the gain calculator 335 calculates the user gain uGain as the noise removal gain ANA_Gain(x,y).

The gain calculator 335 may calculate a second low gain Llow_Gain(x,y) and a second high gain Lhig_Gain(x,y) based on the noise removal gain ANA_Gain(x,y), as expressed by following Equations (15) and (16) (operation S44).

$$Llow\_G(x,y)=\min((Lavg(x,y)-0)/\text{InpMinAvg}, ANA\_Gain(x,y)) \quad (15)$$

$$Lhig\_G(x,y)=\min((255-Lavg(x,y))/\text{InpMaxAvg}, ANA\_Gain(x,y)) \quad (16)$$

The gain calculator 335 may determine a minimum value between a gain {(Lavg(x,y)−0)/InpMinAvg} for stretching a range between the local minimum value Lmin(x,y) and the local average value Lavg(x,y) to a range between a minimum value of a dynamic range 0 and the local average value Lavg(x,y) and the noise removal gain ANA_Gain(x,y), as the second low gain Llow_Gain(x,y). A denominator InpMinAvg of the gain {(Lavg(x,y)−0)/InpMinAvg} is a difference between the local average value Lavg(x,y) and the local minimum value Lmin(x,y), and a numerator is a difference between the local average value Lavg(x,y) and the minimum value of the dynamic range 0.

The gain calculator 335 may determine a minimum value between a gain {(255−Lavg(x,y))/InpMaxAvg} for stretching a range between the local average value Lavg(x,y) and the local maximum value Lmin(x,y) to a range between the local average value Lavg(x,y) and a maximum value of a dynamic range 255, and the noise removal gain ANA_Gain(x,y) as the second high gain Lhig_Gain(x,y). A denominator InpMaxAvg of the gain {(255−Lavg(x,y))/InpMaxAvg} is a difference between the local average value Lavg(x,y) and the local maximum value Lmax(x,y), and a numerator is a difference between the local average value Lavg(x,y) and the maximum value of the dynamic range 255.

That is, the gain calculator 335 may reflect a strength set by the user and the edge amount without fixing the stretching strength, but may restrict an output within the dynamic range.

The corrector 339 may calculate a noise removal correction value ANA_LCE(x,y) of the current pixel by using the second low gain Llow_Gain(x,y) or the second high gain Lhig_Gain(x,y), based on a result of comparing the pixel value INL(x,y) of the current pixel with the local average value Lavg(x,y) (operation S45).

If the pixel value INL(x,y) of the current pixel is equal to or less than the local average value Lavg(x,y), the corrector 339 may calculate the noise removal correction value ANA_LCE(x,y) of the current pixel by using the second low gain Llow_Gain(x,y) calculated by Equation (15), as expressed by following Equation (17).

$$ANA\_LCE(x,y)=(INL(x,y)-Lmin(x,y))*Llow\_Gain(x,y)+Lavg(x,y)-OutMinAvg, \{if\ INL(x,y) \le Lavg(x,y)\} \quad (17)$$

If the pixel value INL(x,y) of the current pixel is greater than the local average value Lavg(x,y), the corrector 339 may calculate the noise removal correction value ANA_LCE(x,y) of the current pixel by using the second high gain hig_Gain(x,y) calculated by Equation (16), as expressed by following Equation (18).

$$ANA\_LCE(x,y)=(INL(x,y)-Lavg(x,y))*Lhig\_Gain(x,y)+Lavg(x,y), \{if\ INL(x,y)>Lavg(x,y)\} \quad (18)$$

The image processor 30B determines whether the current pixel is the last pixel (operation S46), and outputs a corrected image Iout by repeatedly performing operations S41 to S45 to the last pixel (operation S47).

In the exemplary embodiment, the luminance of the pixel is corrected based on the average value Lavg(x,y) in the block, that is, whether the pixel value is less than the local average value or whether the pixel value is greater than the local average value, and thus, the gain set by the user may be reflected. In addition, the contrast of the output image may be improved by reducing the noise amplifying artifact by applying a low gain to the pixel in the region having a low edge amount through the comparison of the edge amount of the entire image with the edge amount of the region.

Figure 6:
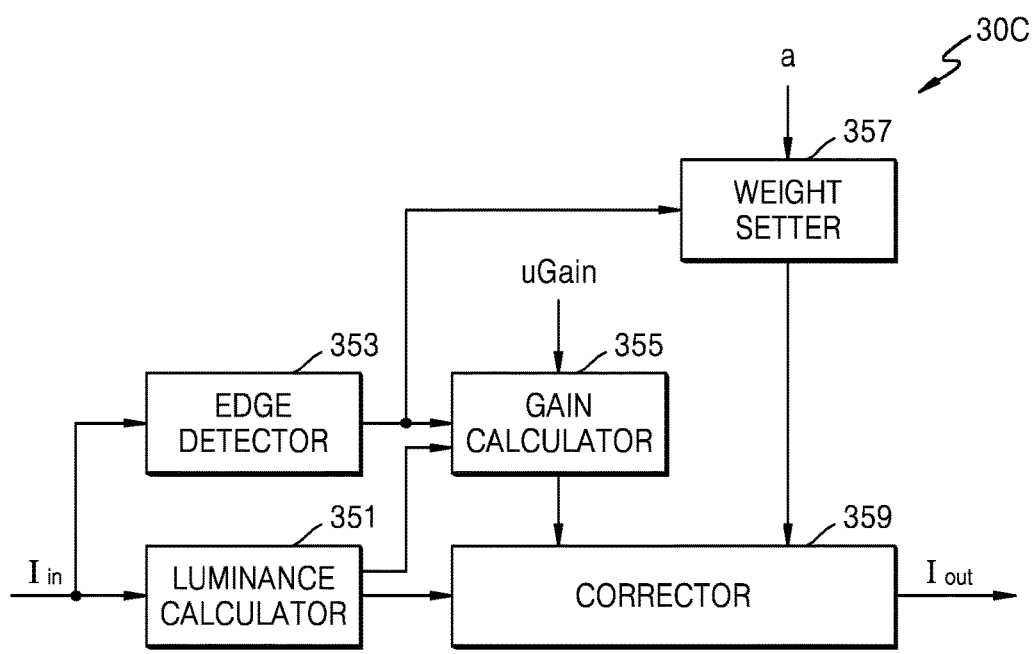
FIG. 6 is a schematic block diagram of an image processor according to another exemplary embodiment.
Figure 7:
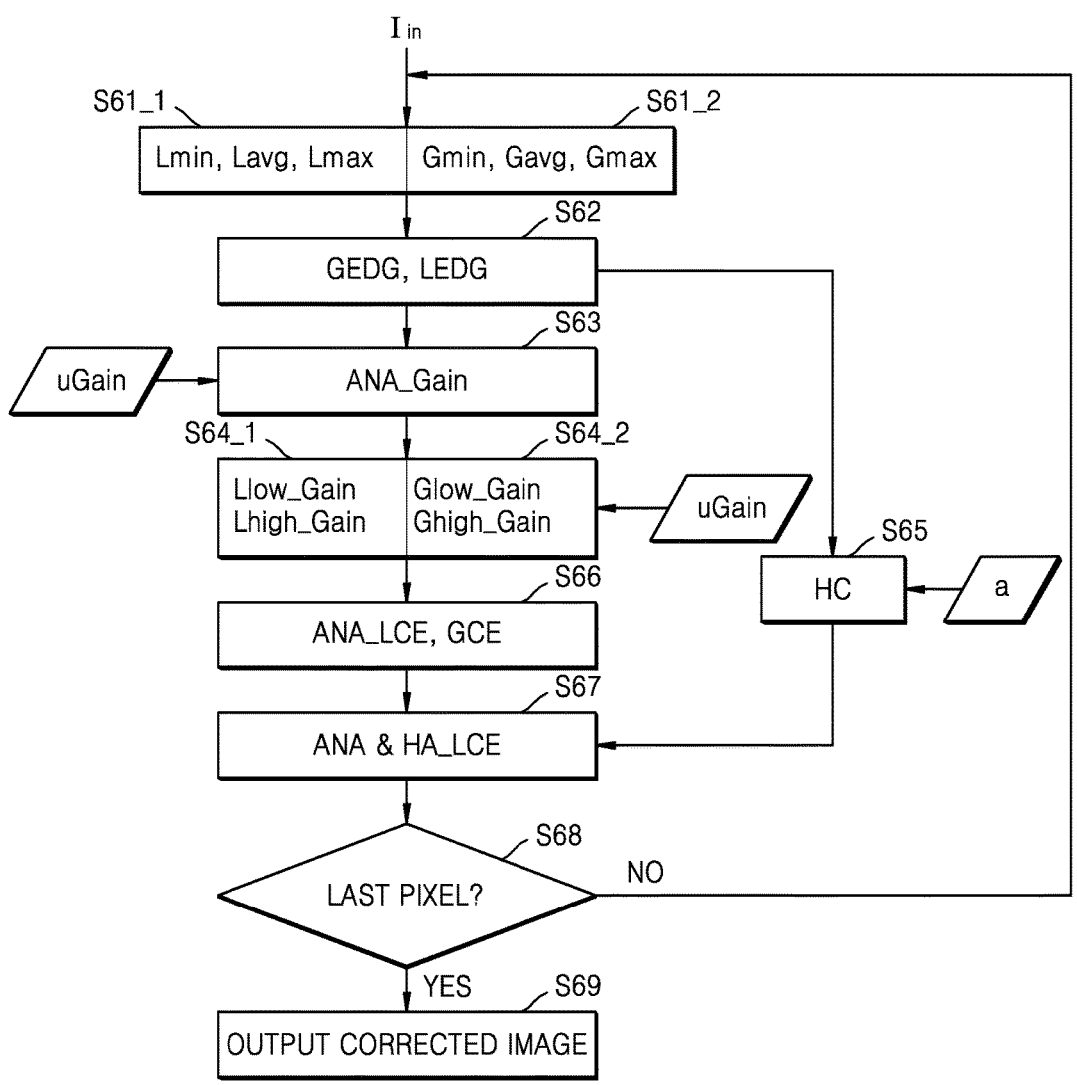
FIG. 7 is a flowchart illustrating an image enhancing function of the image processor of FIG. 6, according to an exemplary embodiment.

FIG. 6 is a schematic block diagram of an image processor 30C according to another exemplary embodiment. FIG. 7 is a flowchart illustrating an image enhancing function of the image processor 30C of FIG. 6.

Referring to FIGS. 6 and 7, the image processor 30C may include a luminance calculator 351, an edge detector 353, a gain calculator 355, a weight setter 357, and a corrector 339. The exemplary embodiment illustrated with reference to FIG. 6 is different from the exemplary embodiment illustrated with reference to FIG. 4 in view of further including the weight setter 357. Hereinafter, descriptions about the same elements as those of FIG. 4 will be omitted.

A halo artifact may occur at a boundary between regions having different textures from each other. An average edge value of the region in which the halo artifact occurs is small, but is greater than that of the region in which the noise amplifying artifact occurs. According to the exemplary embodiment, a corrected image may be output obtained through a weighted sum of a local correction value and a global correction value by varying a weighted value depending on the edge amount of the region to which the pixel belongs.

The luminance calculator 351 may calculate the local minimum value Lmin(x,y), the local maximum value Lmax(x,y), and the local average value Lavg(x,y) according to the equations (1), (2), and (4), within a block based on a current pixel in the input image Iin (for example, (2n+1)×(2m+1) block, n≥0, m≥0) (operation S61_1).

In addition, the luminance calculator 351 may calculate a global minimum value Gmin that is the minimum pixel value, a global maximum value Gmax that is the maximum pixel value, and a global average value Gavg that is an average of the pixel values, from among pixel values of the pixels in the entire input image Iin (operation S61_2).

The edge detector 353 may detect an edge value EDG(x,y) that is a magnitude value of edge at a location of each pixel in the input image Iin. The edge detector 353 may calculate a global edge value GEDG and a local edge value LEDG(x,y) of the input image Iin based on the edge value EDG(x,y) of each pixel (operation S62).

The gain calculator 355 may calculate a noise removal gain ANA_Gain(x,y) as expressed by Equations (13) and (14) by using the global edge value GEDG and the local edge value LEDG(x,y), and the user gain uGain set by the user (operation S63).

The gain calculator 355 may calculate a second low gain Llow_Gain(x,y) and a second high gain Lhig_Gain(x,y) based on the noise removal gain ANA_Gain(x,y), as expressed by Equations (15) and (16) (operation S64_1).

In addition, the gain calculator 355 may calculate a third low gain Glow_Gain and a third high gain Ghig_Gain by using the global minimum value Gmin, the global maximum value Gmax, and the global average value Gavg, as expressed by following Equations (19) to (22).

$$InpMinAvg=Gavg-Gmin \quad (19)$$

$$InpMaxAvg=Gmax-Gavg \quad (20)$$

$$Glow\_Gain=min((Gavg-0)/InpMinAvg, uGain) \quad (21)$$

$$Ghig\_Gain=min((255-Gavg)/InpMaxAvg, uGain) \quad (22)$$

The gain calculator 355 may determine a minimum value between a gain {(Gavg−0)/InpMinAvg} for stretching a range between the global average value Gavg and the global minimum value Gmin to a range between a minimum value of the dynamic range 0 and the global average value Gavg, and the user gain uGain set by the user, as the third low gain Glow_Gain. A denominator InpMinAvg of the gain {(Gavg−0)/InpMinAvg} is a difference between the global average value Gavg and the global minimum value Gmin as shown in Equation (19), and a numerator is a difference between the global average value Gavg and the minimum value of the dynamic range 0.

The gain calculator 355 may determine a minimum value between a gain {(255−Gavg)/InpMaxAvg} for stretching a range between the global average value Gavg and the global maximum value (Gmax) to a range between the global average value Gavg and a maximum value of the dynamic range 255, and the user gain uGain set by the user, as the third high gain Ghig_Gain. A denominator InpMaxAvg of the gain {(255−Gavg)/InpMaxAvg} is a difference between the global average value Gavg and the global maximum value Gmax as expressed by Equation (20), and a numerator is a difference between the global average value Gavg and the maximum value of the dynamic range 255.

The weight setter 357 may set a weighted value HC(x,y) based on a result of comparing the local edge value LEDG(x,y) of the current pixel with the global edge value GEDG (operation S65).

If the local edge value LEDG(x,y) is equal to or less than the global edge value GEDG, in more detail, if the local edge value LEDG(x,y) is equal to or less than a value obtained by multiplying the global edge value GEDG by a predetermined constant a, the weight setter 357 may set a ratio of the local edge value LEDG(x,y) with respect to the value obtained by multiplying the global edge value GEDG by the predetermined constant a as the weighted value HC(x,y) as expressed by following equation (23). If the local edge value LEDG(x,y) is greater than the global edge value GEDG, in more detail, if the local edge value LEDG(x,y) is greater than the value obtained by multiplying the global edge value GEDG by the constant a, the weight setter 357 may set 1 as the weighted value HC(x,y), as expressed by following Equation (24). Here, the constant a may be greater than 1. Because the halo artifact occurs in a region in which the edge is greater than that of the region in which the noise amplifying artifact occurs, the constant a may be greater than 1.

$$HC(x,y)=LEDG(x,y)/(GEDG*a), \{\text{if } LEDG(x,y) \le (GEDG*a)\} \quad (23)$$

$$HC(x,y)=1, \{\text{if } LEDG(x,y)>(GEDG*a), \text{ where } a>1.0\} \quad (24)$$

The corrector 359 may calculate a noise removal correction value ANA_LCE(x,y) and a global correction value GCE(x,y) (operation S66).

The corrector 359 may calculate the noise removal correction value ANA_LCE(x,y) of the current pixel as expressed by Equations (17) and (18), according to a relationship between the pixel value INL(x,y) of the current pixel and the local average value Lavg(x,y).

In addition, the corrector 359 may calculate a global correction value GCE(x,y) of the current pixel as expressed by following Equations (25) and (26), according to a relationship between the pixel value INL(x,y) of the current pixel and the global average value Gavg. If the pixel value INL(x,y) of the current pixel is equal to or less than the global average value Gavg, the corrector 359 may calculate the global correction value GCE(x,y) of the current pixel by using the third low gain Glow_Gain calculated by Equation (21), as expressed by Equation (25). If the pixel value INL(x,y) of the current pixel is greater than the global average value Gavg, the corrector 359 may calculate the global correction value GCE(x,y) of the current pixel by using the third high gain Ghig_Gain calculated by Equation (22), as expressed by Equation (27).

$$GCE(x,y)=(INL(x,y)-G\min)*Glow\_Gain+Gavg-OutMinAvg, \{\text{if } INL(x,y) \le Gavg\} \quad (25)$$

$$OutMinAvg=InpMinAvg*Glow\_Gain \quad (26)$$

$$GCE(x,y)=(INL(x,y)-Gavg)*Ghig\_Gain+Gavg, \{\text{if } INL(x,y)>Gavg\} \quad (27)$$

$$OutMaxAvg=InpMaxAvg*Ghig\_Gain \quad (28)$$

The corrector 359 may calculate a noise and halo removal correction value ANA & HA_LCE(x,y) of the current pixel by applying the weighted value HC(x,y) to the noise removal correction value ANA_LCE(x,y) and the global correction value GCE(x,y), as expressed by following equation (29) (operation S67). The weighted value of the noise removal correction value ANA_LCE(x,y) is HC(x,y), and the weighted value of the global correction value GCE(x,y) is 1-HC(x,y). The pixel having the global edge value less than the local edge value may have the weighted value set in the noise removal correction value, the weighted value being less than that of in the global correction value. The pixel having the local edge value greater than the global edge value has a weighted value of 1 set in the noise removal correction value, and a weighted value of 0 set in the global correction value.

$$ANA\&HA\_LCE(x,y)=ANA\_LCE(x,y)*HC(x,y)+GCE(x,y)*(1-HC(x,y)) \quad (29)$$

The image processor 30C determines whether the current pixel is the last pixel (operation S68), and outputs a corrected image Iout by repeatedly performing operations S61 to S67 to the last pixel (operation S69).

In the exemplary embodiment, because the weighted value HC(x,y) is set according to the relationship between the local edge value LEDG(x,y) and the global edge value GEDG, the corrector 359 may improve contrast of the output image by adjusting a degree of combining the noise removal correction value ANA_LCE(x,y) and the global correction value GCE(x,y) according to the local edge value LEDG(x,y) and the global edge value GEDG.

Figure 8:
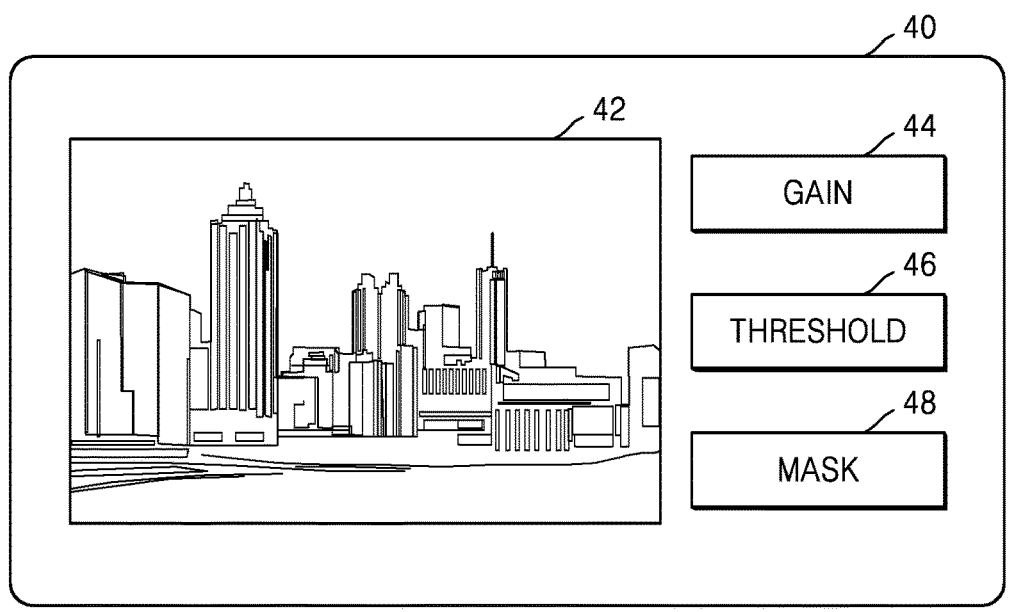
FIG. 8 is a diagram of an example of a graphic user interface provided by an image processor performing an image enhancing operation according to an exemplary embodiment.

FIG. 8 is a diagram of an example of a graphic user interface provided by an image processor 30A, 30B, or 30C performing an image enhancing operation according to an exemplary embodiment.

The image processor 30A, 30B, or 30C may provide an interface 40, through which a parameter used in correction for enhancing the contrast of the image may be input, on a display. The interface 40 may provide at least one of a real-time image and a corrected image in a first region 42.

The user may designate a user gain by using a gain setting field 44.

The user may designate a critical value or a constant (e.g., a) for adjusting the threshold value by using a threshold value setting field 46.

The user may designate a block size by using a mask setting field 48.

The user may directly input or select various parameters according to an input type provided by the interface 40.

According to the image enhancement method, the image that has degraded due to the fog, etc. may be enhanced, and a gain that is not fixed, but designated by the user may be reflected. In addition, according to the image enhancement method of the exemplary embodiment, the image may be enhanced while adaptively adjusting the gain according to the edge amount and the luminance distribution of the image, and thus, the noise and the halo artifact that may occur during the enhancement of the image may be reduced.

The image enhancement method according to the exemplary embodiment may be implemented as computer-readable codes in a computer-readable recording medium. The computer readable recording medium is any data storage device that may store programs or data which may be thereafter read by a computer system. Examples of the computer readable recording medium include read-only memory (ROM), random-access memory (RAM), CD-ROMs, magnetic tapes, floppy disks, optical data storage devices, and so on. The computer readable recording medium may also be distributed over network coupled computer systems so that the computer readable code is stored and executed in a distributive manner. Also, functional programs, codes, and code segments for accomplishing the exemplary embodiment may be easily construed by programmers skilled in the art to which the exemplary embodiment pertains.

According to one or more exemplary embodiments, the image that has degraded due to the fog, etc. is enhanced taking into account the edge amount and the luminance distribution of the image, and thus, unnecessary noise and/or halo artifact may be decreased.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope of the inventive concept as defined by the following claims.

What is claimed is:

1. An image enhancement method for an image processing device, the image enhancement method comprising:
    calculating a first minimum value, a first maximum value, and a first average value of a luminance of a region based on a pixel in an image;
    calculating a first gain with respect to a pixel having a pixel value between the first minimum value and the first average value, and a second gain with respect to a pixel having a pixel value between the first average value and the first maximum value;
    calculating a first correction value by correcting the pixel value of the pixel by using the first gain or the second gain according to a result of comparing the pixel value of the pixel with the first average value; and
    calculating a first edge value of an entire image and a second edge value of the region based on the pixel, and
    wherein the first gain and the second gain are calculated based on the first edge value and the second edge value.

2. The image enhancement method of claim 1, wherein the calculating of the first correction value comprises:
    calculating the first correction value of the pixel by using the first gain, in response to determining that the pixel value of the pixel is equal to or less than the first average value; and
    calculating the first correction value of the pixel by using the second gain, in response to determining that the pixel value is greater than the first average value.

3. The image enhancement method of claim 1, further comprising:
    calculating a third gain based on the first edge value and the second edge value.

4. The image enhancement method of claim 3, wherein the first gain is a minimum value between a ratio of a difference between the first minimum value and the first average value and a difference between a minimum value of a dynamic range and the first average value, and the third gain, and
    wherein the second gain is a minimum value between a ratio of a difference between the first maximum value and the first average value and a difference between a maximum value of the dynamic range and the first average value, and the third gain.

5. The image enhancement method of claim 3, wherein a third gain with respect to a pixel, in which the second edge value is less than the first edge value, is less than a third gain with respect to a pixel, in which the second edge value is greater than the first edge value.

6. The image enhancement method of claim 3, further comprising:
    calculating a second minimum value, a second maximum value, and a second average value of a luminance of the entire image;
    calculating a fourth gain with respect to a pixel having a pixel value between the second minimum value and the second average value and a fifth gain with respect to a pixel having a pixel value between the second average value and the second maximum value;
    calculating a second correction value by correcting the pixel value of the pixel by using the fourth gain or the fifth gain according to a result of comparing the pixel value of the pixel with the second average value; and
    calculating a weighted sum of the first correction value and the second correction value by using a weighted value set based on the first edge average value and the second edge average value.

7. The image enhancement method of claim 6, wherein the first gain is a minimum value between a ratio of a difference between the first minimum value and the first average value and a difference between a minimum value of a dynamic range and the first average value, and the third gain, and
    wherein the second gain is a minimum value between a ratio of a difference between the first maximum value and the first average value and a difference between a maximum value of the dynamic range and the first average value, and the third gain.

8. The image enhancement method of claim 6, wherein the fourth gain is a minimum value between a ratio of a difference between the second minimum value and the second average value and a difference between a minimum value of a dynamic range and the second average value, and a user gain, and
    wherein the fifth gain is a minimum value between a ratio of a difference between the second maximum value and the second average value and a difference between a maximum value of the dynamic range and the second average value, and the user gain.

9. The image enhancement method of claim 6, wherein a weighted value set in the first correction value of a pixel, in which the second edge value is less than the first edge value, is less than a weighted value set in the second correction value, and
    wherein weighted values set in the first correction value and the second correction value of a pixel, in which the second edge value is greater than the first edge value, are 1 and 0, respectively.

10. The image enhancement method of claim 3, wherein the tin the third gain is obtained by multiplying a value subtracting 1 from a user gain by a ratio of the second edge value with respect to the first edge value and adding 1 to the multiplied value, when the second edge value is less than the first edge value, and the third gain is the user gain, when the second edge value is equal to or greater than the first edge value.

11. An image processing device comprising at least one processor to implement:
   a luminance calculator configured to calculate a first minimum value, a first maximum value, and a first average value of a luminance of a region based on a pixel in an image;
   a gain calculator configured to calculate a first gain with respect to a pixel having a pixel value between the first minimum value and the first average value, and a second gain with respect to a pixel having a pixel value between the first average value and the first maximum value; and
   a corrector configured to calculate a first correction value by correcting the pixel value of the pixel by using the first gain or the second gain according to a result of comparing the pixel value of the pixel with the first average value,
   wherein the image processing device further comprises an edge detector configured to calculate a first edge value of an entire image and a second edge value of the region based on the pixel, and
   wherein the first gain and the second gain are calculated based on the first edge value and the second edge value.

12. The image processing device of claim 11, wherein the corrector is configured to calculate the first correction value of the pixel by using the first gain, in response to determining that the pixel value of the pixel is equal to or less than the first average value, and to calculate the first correction value of the pixel by using the second gain, in response to determining that the pixel value is greater than the first average value.

13. The image processing device of claim 11,
   wherein the gain calculator is further configured to calculate a third gain based on the first edge value and the second edge value,
   wherein the first gain is a minimum value between a ratio of a difference between the first minimum value and the first average value and a difference between a minimum value of a dynamic range and the first average value, and the third gain, and
   wherein the second gain is a minimum value between a ratio of a difference between the first maximum value and the first average value and a difference between a maximum value of the dynamic range and the first average value, and the third gain.

14. The image processing device of claim 13, wherein a third gain with respect to a pixel, in which the second edge value is less than the first edge value, is less than a third gain with respect to a pixel, in which the second edge value is greater than the first edge value.

15. The image processing device of claim 13, further comprising a weight setter configured to determine a weighted value based on the first edge value and the second edge value,
   wherein the luminance calculator is further configured to calculate a second minimum value, a second maximum value, and a second average value of a luminance of the entire image,
   wherein the gain calculator is further configured to calculate a fourth gain with respect to a pixel having a pixel value between the second minimum value and the second average value and a fifth gain with respect to a pixel having a pixel value between the second average value and the second maximum value, and
   wherein the corrector is further configured to calculate a second correction value by correcting the pixel value of the pixel by using the fourth gain or the fifth gain according to a result of comparing the pixel value of the pixel with the second average value, and to calculate a weighted sum of the first correction value and the second correction value by using the weighted value.

16. The image processing device of claim 15, wherein the first gain is a minimum value between a ratio of a difference between the first minimum value and the first average value and a difference between the minimum value of the dynamic range and the first average value, and the third gain, and
   wherein the second gain is a minimum value between a ratio of a difference between the first maximum value and the first average value and a difference between the maximum value of the dynamic range and the first average value, and the third gain.

17. The image processing device of claim 15, wherein the fourth gain is a minimum value between a ratio of a difference between the second minimum value and the second average value and a difference between the minimum value of the dynamic range and the second average value, and a user gain, and
   wherein the fifth gain is a minimum value between a ratio of a difference between the second maximum value and the second average value and a difference between the maximum value of the dynamic range and the second average value, and the user gain.

18. The image processing device of claim 15, wherein a weighted value set in the first correction value of a pixel, in which the second edge value is less than the first edge value, is less than a weighted value set in the second correction value, and
   wherein weighted values set in the first correction value and the second correction value of a pixel, in which the second edge value is greater than the first edge value, are 1 and 0, respectively.

19. The image processing device of claim 13, wherein the third gain is obtained by multiplying a value subtracting 1 from a user gain by a ratio of the second edge value with respect to the first edge value and adding 1 to the multiplied value, when the second edge value is less than the first edge value, and
   the third gain is the user gain, when the second edge value is equal to or greater than the first edge value.

20. A non-transitory computer-readable recording medium having recorded thereon a program, which when executed by a computer, causes the computer to:
   calculate a first minimum value, a first maximum value, and a first average value of a luminance of a region based on a pixel in an image;
   calculate a first gain with respect to a pixel having a pixel value between the first minimum value and the first average value, and a second gain with respect to a pixel having a pixel value between the first average value and the first maximum value;
   calculate a first correction value by correcting the pixel value of the pixel by using the first gain or the second gain according to a result of comparing the pixel value of the pixel with the first average value; and calculate a first edge value of an entire image and a second edge value of the region based on the pixel,
wherein the first gain and the second gain are calculated based on the first edge value and the second edge value.

\* \* \* \* \*